July 3, 1962  C. L. SAINTY  3,042,388
MANUFACTURE OF AGGREGATE SUITABLE FOR USE IN
CONCRETE AND LIKE COMPOSITE MATERIALS
Filed Dec. 8, 1958  3 Sheets-Sheet 1

Inventor,
Christopher L. Sainty
By Hall & Houghton
Attorney.

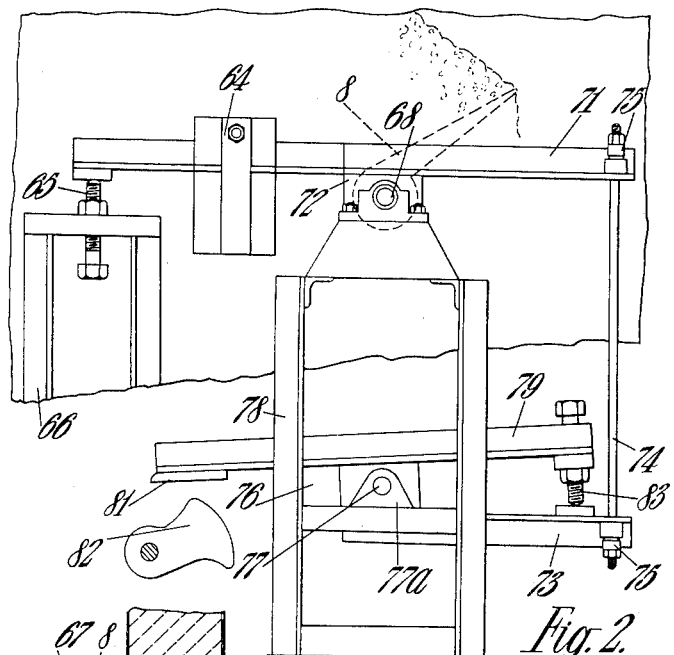
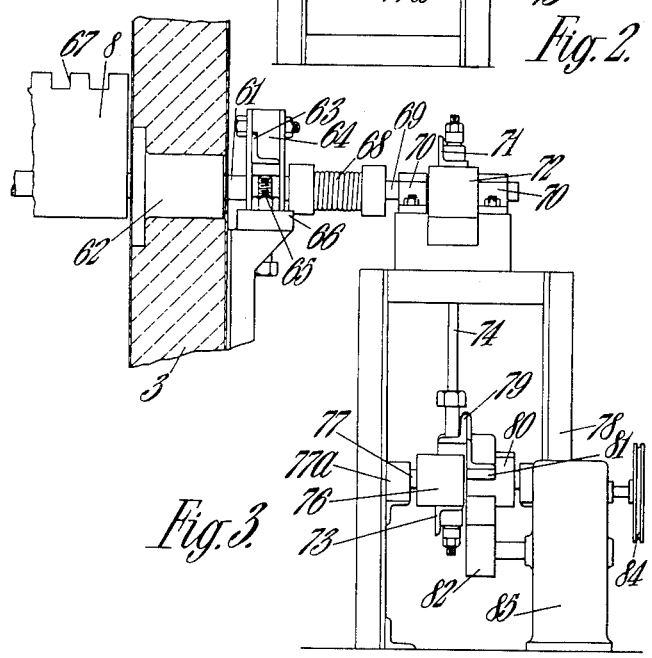

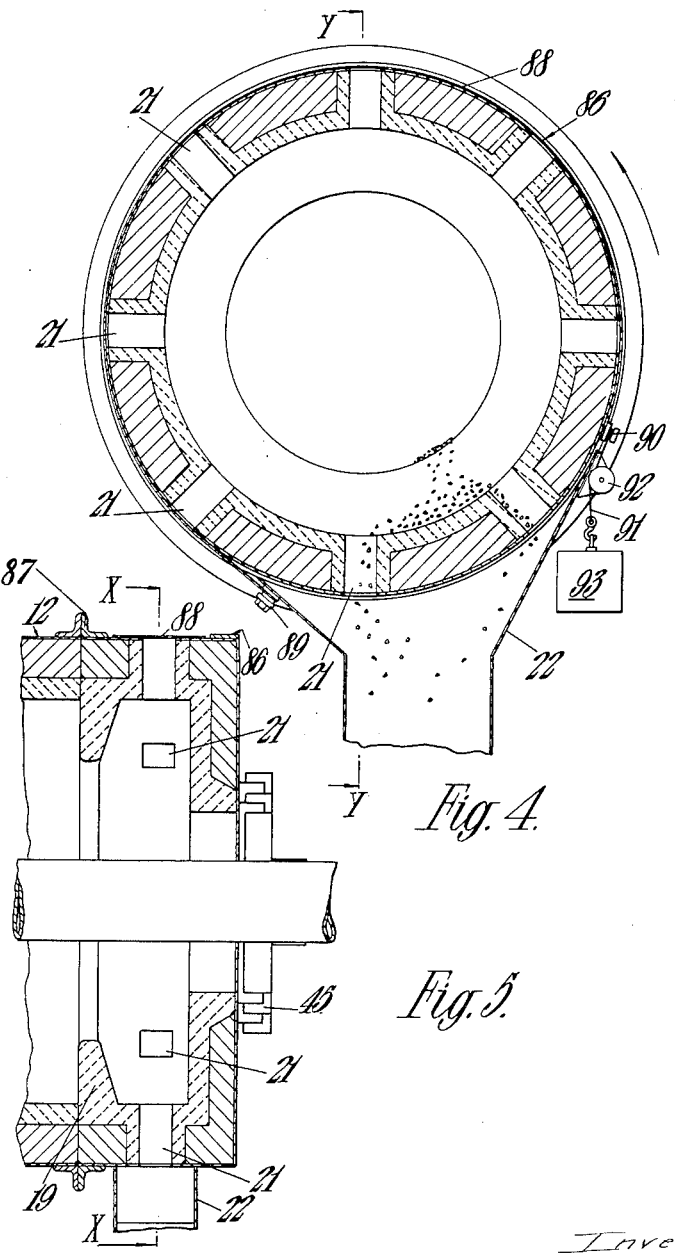

United States Patent Office 3,042,388
Patented July 3, 1962

3,042,388
MANUFACTURE OF AGGREGATE SUITABLE FOR USE IN CONCRETE AND LIKE COMPOSITE MATERIALS
Christopher L. Sainty, Hassocks, England, assignor to Structural Concrete Components Limited, Hassocks, England
Filed Dec. 8, 1958, Ser. No. 778,728
Claims priority, application Great Britain Dec. 17, 1957
8 Claims. (Cl. 263—32)

This invention relates to the manufacture of aggregate such as may be used in concrete and like materials, such aggregate comprising bodies or pellets of the desired size which are preferably rounded or roughly spherical in shape and which are composed of clay, shale, or other suitable material which is fired at a suitable temperature to afford the bodies sufficient strength. Where a light-weight aggregate is desired the material used is of a character which expands on firing and develops a cellular or similar structure. The so-called bloating clays or shales are suitable for making light-weight aggregate but it is found that many such materials not usually regarded as having bloating characteristics can be caused to expand moderately under suitably controlled firing conditions.

It has been found that in order to ensure a uniform aggregate of sufficient strength it is necessary to control both the rate of heating and the final temperature of the firing process. This is particularly necessary where an expanded or cellular type aggregate is required, since it is found that with many clays or like materials, if the time taken to reach the firing temperature is too great there will be little or no expansion, whereas too rapid heating or too high a final temperature results either in disintegration of the aggregate or an irregular or excessive expansion thereof.

It is the object of the invention to provide an improved method and an apparatus or plant for the firing of bodies or pellets of clay, shale or other material which affords a uniform product having the desired characteristics and with a fuel consumption which is considerably less than in a conventional kiln or furnace.

The discrete bodies from which the aggregate is formed will be referred to hereinafter for convenience as pellets.

The invention consists of the method of manufacturing an aggregate of the character referred to which comprises the steps of feeding moist or partially dried pellets through a preheating zone and subsequently through a firing zone, controlling the rate of feed of pellets through the preheating zone preferably by intermittently retarding gravity flow of the pellets in said zone, passing hot gases from the firing zone in counterflow direction through the pellets in the preheating zone to effect complete drying of the pellets, and discharging fired pellets from the firing zone through a cooling zone. Preferably heated air from the cooling zone is admitted to the preheating zone to assist in carrying off water evaporated during drying, and also to control the temperature in the said zone and to assist in the oxidation of the pellets, whereby risk of coagulation is reduced.

The invention also consists in apparatus or plant for the manufacture of fired aggregate of the character referred to, comprising a heat interchange means through which pellets flow by gravity, means for intermittently retarding the flow of pellets to provide a uniform feed thereof, a rotary furnace or kiln arranged to receive completely dried pellets from the heat interchange means, means for drawing hot gases from the furnace through the pellets in the heat interchange means, and a cooler for the pellets discharged from the furnace or kiln. Preferably air from the cooler is admitted to the heat interchange means and the latter comprises a series of inclined surfaces in vertical zig-zag formation down which the pellets flow by gravity.

In the drying and firing of materials, as for example in the wet process of manufacturing Portland cement, it is usual to carry out the stages of drying, preheating, and fusion or firing in a single rotary kiln of considerable length. Such an arrangement precludes the possibility of separately controlling the temperature and the oxygen content of the kiln gases at the various stages. This difficulty is overcome by the present invention which also has the advantage of enabling a relatively short rotary kiln to be employed, thereby greatly reducing the first and maintenance costs of the installation.

One preferred mode of carrying the invention into effect is illustrated by the following example.

In the accompanying drawings,

FIGURE 2 is an end elevation, to an enlarged scale, of mechanism for actuating oscillating valves for controlling flow of material in the plant of FIGURE 1;

FIGURE 3 is a side elevation, partly in section, of FIGURE 2;

FIGURE 4 is a cross section, on the line X—X of FIGURE 5, of the outlet end of the rotary kiln or furnace of FIGURE 1;

FIGURE 5 is a longitudinal section on the line Y—Y of FIGURE 4.

Figure 1:
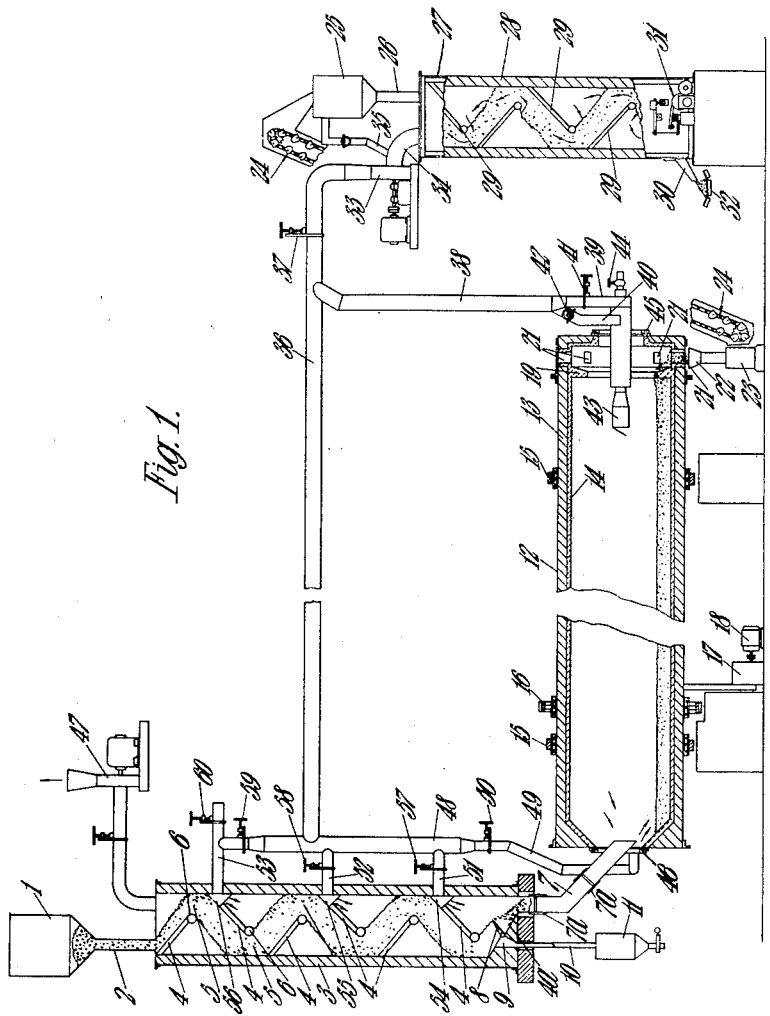
FIGURE 1 is an elevation, partly in cross section, of an apparatus or plant for the manufacture of fired aggregate suitable for use in concrete and like materials, constructed and arranged in accordance with one form of the invention.

In carrying the invention into effect according to one convenient mode, described by way of example in connection with the accompanying drawings, there is provided a hopper 1 into which moist or partially dried pellets of clay, shale, or other suitable material are fed in any convenient manner, e.g. from a pellet forming machine or from a storage supply. The pellets pass by gravity through a vertical tube 2 to a preliminary heater or heat interchanger comprising a vertical tubular casing 3 of rectangular cross section which may be of steel with or without a refractory lining, and is insulated externally. Within the casing 3 are arranged a series of inclined partitions or shelves 4 which extend in zig-zag formation alternately from one side of the casing to a point spaced from the opposite side thereof to leave a rectangular space or slot (indicated at 5 at the upper end of said casing) between the end of the partition and the casing side. The partitions 4 are formed as laterally flanged metal plates the end of which are rolled as indicated at 6. The inclination of the partitions 4 to the horizontal is rather more than that of the angle of repose of the pellet material (generally about 40°) so that the pellets will travel by gravity down the upper partition 4 to which they are fed and thence through the space 5 and down the next partition 4 which is oppositely directed. The arrangement is such that if the flow of pellets from the lowermost partition is stopped whilst feeding to the upper end is continued there will result an equal depth of pellets on all the partitions except the uppermost. If in these circumstances a quantity of pellets is released from the lowermost partition, an equal quantity will flow by gravity from each partition to the partition below it. The lowermost partition 4 as seen in FIGURE 1 leads to a similarly inclined surface 4a which in turn leads to an inclined delivery chute 7 having expansion joints 7a. At a suitable position on the inclined surface 4a there is mounted a pivoted flap valve 8 which when raised, as seen in FIGURE 1, is adapted to stop the flow of pellets through the casing 3 in the manner previously described. The arrangement is such that if the valve 8 is displaced angularly through about 10° in a clockwise direction and then immediately returned to its original position, some pellets will be spilled over to the chute 7. Means, hereinafter described, is provided for periodically oscillating the valve 8 so that a uniform flow of pellets in equal doses is directed into the chute 7, with the result that the whole mass of pellets in the casing 3 moves downwardly at a uniform rate. It may be noted that owing to the tendency of adjacent layers of pellets to slide one over the other, some mixing occurs as they pass from one partition to the next. Also in general those pellets which were at or near the top of the layer on one partition will be at or near the bottom of the layer on the succeeding partition. Thereby the drying and heating of the pellets is extremely uniform and they enter the furnace at substantially the same temperature. Since the pellets are heated in the casing 3, as hereinafter described, some fragmentation or dust formation may take place and this interferes with the flow of pellets and also of gas. A slot 9 is accordingly provided to the rear of the valve 8 leading through a pipe or chute 10 to a collecting vessel 11. Alternatively the inclined surface 4a may be formed as a grid of sufficient fineness not to pass pellets.

The heated pellets pass through the chute 7 to a rotary furnace or kiln, indicated generally at 12, of the horizontal type, comprising a steel or other casing 13 suitably insulated, and a refractory lining 14. The casing is provided with track rings 15 supported on rollers which are not shown but may be of conventional type as employed in rotary cement kilns. The casing is driven through one (or more) gear rings 16 from a pinion (not shown) forming part of a gear box 17 having a driving motor 18. The furnace casing 12 is preferably mounted to give a slight slope towards the outlet end, the depth of pellets being determined by an annular sill 19. As the casing rotates, the pellets are rolled until they are discharged over the sill to an outlet region 20 and thence through delivery ports 21 to a funnel or hopper 22 and thence to the base compartment 23 of a bucket elevator indicated generally at 24. The elevator discharges to a hopper 25 from which a vertical pipe 26 leads to a cooler 27. The cooler comprises a vertical casing 28 of rectangular section having therein a series of inclined partitions 29 in zig-zag arrangement, the construction being similar to that of the heater structure 3 previously described, and the discharge of cooled pellets through a chute 30 is controlled by an oscillating valve (not shown) similar to the previously described valve 8 and actuated by mechanism indicated generally at 31. The cooled pellets are discharged to a conveyor 32.

Cooling of the pellets is effected by a motor driven blower 33 connected by a pipe 34 to the upper end of the cooler 27 and drawing air from the lower end thereof through the layers of pellets. The temperature of air leaving the cooler will be in the region of 600° F. and the blower is provided with water cooled bearings. A branch connection 35 to the pipe 34 draws air through the casing of the elevator 24 for cooling purposes. The flow of pellets through the cooler 27 is adjusted so that the tube 26 is always full. Hot air from the blower 33 is delivered to a pipe 36 through a control gate valve 37, and a branch pipe 38 leads through further branches 39 and 40 controlled by valves 41 and 42 to a burner 43 located in the outlet end of the rotary furnace 12. A gas burner having a fuel control valve 44 is shown, but oil or powdered coal burners could be employed. The air branch 39 provides heated combustion air and the branch 40 provides heated secondary air. The rotary furnace 12 is operated with an internal air pressure slightly below atmospheric, and inward leakage of air is restricted by labyrinth glands 45 and 46, and by controlling the furnace delivery ports 21 by the means to be later described.

The products of combustion and secondary air pass from the furnace 12 through the pellet delivery chute 7 and into the lower end of the heater casing 3 through which they are drawn upwardly by a blower 47 and discharged to atmosphere. The hot gases traverse the moist or partially dried pellets on the inclined partitions 4. To provide additional air to carry away moisture evaporated from the pellets, to regulate the temperature at different stages in the heater 3, and to provide additional oxidation, heated air from the cooler 27 is supplied. The pipe 36 communicates with a cross pipe 48 the lower end of which leads through a pipe 49 controlled by a valve 50 to the inlet end of the furnace. Branches 51, 52, 53 from the cross pipe 48 lead to three headers 54, 55 and 56 disposed at different heights in the heater casing 3 to distribute the hot air over the pellets on the sloping partitions 4. The hot air supplied through the pipe 49 to the inlet end of the furnace 12 will have a temperature considerably below that of the furnace and hence will sink into contact with the pellets in the furnace. This air supply not only increases the oxygen content of the gases in the region of the pellets at entry, but also reduces thermal shock to which the pellets are subjected by radiation from the furnace walls. It is found that such air supply assists in reducing fragmentation as well as coagulation and clinkering of the pellets.

The hot air introduced to the heater 3 through the cross pipe 48 is generally cooler than the gases rising from the chute 7, and valves 57, 58 and 59 are provided to control the amount of air introduced. A valve 60 is provided to enable atmospheric air to be introduced, if desired, into the upper part of the heater where the pellets are generally moist and relatively cool, so that a lower temperature is desirable to prevent fragmentation.

The mechanism for actuating the oscillating valve 8 for the heater 3 and/or the cooler 27, is shown in FIGURES 2 and 3. The valve 8 is carried on a shaft 61 supported in bearing 62 and extends through the casing 3 (or 28) on either side thereof. An arm structure 63 is attached to the shaft 61 outside the casing and carries an adjustable weight 64 enabling the turning moment on the shaft to be varied. In its rest position the arm structure 63 rests upon a bolt 65 in a fixed support 66 so that the inclination of the valve at rest can be adjusted. The edge of the valve is serrated as shown at 67. This prevents channeling of the pellets and consequent non-uniform flow from the previous inclined partition. The shaft 61 is attached by a flexible coupling 68 to a second shaft 69 supported in bearings 70. An arm 71 is attached to the shaft 69 by a block 72 and is connected to a lever 73 by a link 74 having ball and socket type joints 75 at each end. The lever 73 is attached to a block 76 pivotal on a fixed shaft 77 supported by brackets 77a on a frame 78 which also supports the previously mentioned bearings 70. A second lever 79 is secured to a block 80, also rotatable on the fixed shaft 77, and carries a shoe 81 arranged to be engaged by a rotary cam 82 to oscillate the lever, motion of which is transmitted to the lever 73 by an adjustable bolt 83. The cam 82 is driven from a pulley 84 through reduction gearing 85. A suitable rate of cam operation is from 8 to 10 r.p.m. In operation, rotation of the cam 82 engages the shoe 81 and depresses the levers 73 and 79 to displace the valve 8 clockwise as seen in FIGURES 1 and 2. A quick return movement of the valve is obtained as the cam leaves the shoe 81, and is effected by the balance weight 64. The arrangement permits wide variation in the operation of the valve 8, and hence in the flow of pellets, as by varying the speed of the cam and adjustment of the bolt 83. Further variation is possible by adjustment of the bolt 65.

Referring to FIGURES 4 and 5, the outlet end portion of the rotary furnace 12 is constituted by a separate member 86 which is bolted to the main furnace portion by means of flanges 87. The outlet ports 21 in the end member 86 are partially enclosed by a flexible valve band 88 of heat resisting steel, preferably between 1/20 and 1/10 of an inch thick. One end of the band 88 is anchored to a pivot 89 on one side of the pellet collecting funnel 21. The outer end of the band is connected by an anchor pin 90 on the band to a cable 91 running over a pulley 92 mounted on the opposite side of the funnel 22 and attached to a weight 93. Thus as the furnace rotates, only two lower ports 21 will be open for discharge, thereby restricting leakage of air into the furnace. The funnel 22 is shaped in cross section so that it lies to one side of the furnace axis, as seen in FIGURE 4 to take account of the fact that owing to the rotation of the furnace, pellets are discharged over the sill 19 at an inclination to the vertical, and thus some pellets will be delivered through a port 21 which has passed the lowest point in its travel.

As previously explained, it is desirable that the pipe 26 leading to the cooler 27 should be maintained full of pellets. This may be effected by providing two thermopiles at different levels in the hopper 25, the thermopiles being sensitive to radiant heat from the pellets and being connected through suitable amplifying means to stop and start a motor driving the operating mechanism 31 for the oscillating valve as required.

It will be understood that in many installations it will not be necessary to provide for such a complicated distribution of heated air to the heat interchanger 3 as described above, this depending upon the nature of the pellets.

In a typical installation according to the invention, the maximum temperature in the rotary furnace, which is about 45 feet in length, is about 1,850° F. and occurs a few feet in advance of the burner. The temperature at the inlet end is about 1,300° F. The dried pellets leave the heat interchanger 3 at about 1000° F. Gases leave the blower 47 at between 170° and 200° F. The fired pellets leave the furnace at about 1,700° F. and are discharged from the cooler at about 250° F. Air extracted from the cooler by the blower 33 has a temperature of about 600° F. It will be understood that these conditions may vary widely in accordance with the character of the pellet material.

The initial water content of the pellets supplied to the plant will generally be between 15 and 30 percent of their dry weight. By this invention, provision is made for driving off the free and combined water from the pellets without causing them to shatter. The completely dried pellets are then heated in the furnace as rapidly as possible to a temperature near the fusion point, the heating being uniform and the maximum temperature not being maintained for too long a period. Poor expansion is generally due to prolonged heating prior to fusion and this is avoided by the present invention. The heating of the fused and expanding pellets is also closely controlled so that a desirable and uniform expansion without breakage or cracking of the outer skin is achieved.

The invention also provides for uniformity in the preliminary drying of the pellets before delivery to the furnace and thus constitutes an important advance over conventional vertical driers or kilns in which the heating is uneven even if the gas flow is uniform over the whole of the cross section.

I claim:

1. The method of manufacturing a fired aggregate for use in concrete and like materials from moist or partially dried pellets of argillaceous material which comprises the steps of flowing said moist or partially dried pellets through a drying and preheating zone by gravity in a consecutive series of alternately oppositely directed paths inclined at an angle sufficient to provide a uniform flow and intermixture of the pellets, confining the whole of the flowing pellet material to said inclined paths feeding the dried and preheated pellets to a firing zone, controlling the rate of flow of pellets through the drying and preheating zone by intermittently stopping the flow of the pellets only on the lowest of their inclined paths, introducing hot gases from the firing zone to the drying and preheating zone and causing the whole of said introduced gases to pass in countercurrent flow through the mass of pellets lying along the inclined paths, passing a sufficient quantity of heated air from a cooling zone to the drying and preheating zone and causing the whole of such introduced air to pass in countercurrent flow through the mass of pellets in the inclined paths to carry off the moisture for drying, separately supplying an additional quantity of heated air from the cooling zone to the firing zone at the region thereof to which the dried and preheated pellets are fed to pass into contact with the pellets, and controlling the rate of cooling in the cooling zone.

2. The method according to claim 1 in which progressive or graduated cooling of the fired pellets is effected by flowing said pellets through the cooling zone by gravity in a consecutive series of alternately oppositely directed paths inclined at an angle only sufficiently greater than the angle of repose of the pellet material to provide a uniform flow and intermixture of the pellets, passing cooling air through the mass of pellets in said inclined paths, and controlling the flow of pellets by intermittently stopping the flow of said pellets in their inclined paths.

3. Apparatus or plant for the manufacture of fired aggregate of the character referred to, comprising heat interchange means to which moist or partially dried pellets are fed, said heat interchange means comprising a consecutive series of alternately oppositely inclined imperforate surfaces down which the pellets flow by gravity, the angle of inclination of said surfaces being only sufficiently greater than the angle of repose of the pellet material to provide a uniform flow and intermixture of the pellets, oscillating valve means disposed only at the lowermost of said inclined surfaces for intermittently stopping the flow of pellets on said series of inclined surfaces, means for controlling the rate of operation of said oscillating valve means and hence the rate of flow of pellets, a rotary furnace or kiln arranged to receive dried and preheated pellets from said heat interchange means, means for feeding fired pellets from said rotary furnace or kiln to a cooler, means for delivering hot gases from the rotary furnace or kiln and heated gases from the cooler to the aforesaid heat interchange means and for forcing the whole of said delivered gases in countercurrent flow through the mass of pellets in the said inclined paths, separate means for supplying an additional quantity of heated air from the cooler to the rotary furnace or kiln at the region thereof at which the pellets are introduced to pass ino contact with the pellets, and means for controlling the rate of cooling in the cooler to afford progressive or graduated cooling.

4. Apparatus or plant according to claim 3, in which the cooler comprises a vertical series of oppositely inclined imperforate surfaces down which the fired pellets flow by gravity, the angle of inclination of said surfaces being only sufficiently greater than the angle of repose of the pellet material to provide uniform pellet flow, and oscillating valve means arranged to stop the flow of pellets down said inclined surfaces intermittently and thereby control the rate of flow of pellets.

5. Apparatus or plant according to claim 3, in which the said oscillating valve means comprises a pivotally mounted plate having a flow controlling edge of serrated form, said plate extending over the full width of the surface and extending upwardly and forwardly therefrom at an angle greater than 90° to said surface.

6. Apparatus or plant according to claim 3, in which actuating means for the oscillating valve means comprises a rotary cam, lever means intermittently engaged by said cam, a counterweighted shaft carrying the said oscillating valve, and an operative connection between said lever means and said shaft, said rotary cam and lever means being arranged to give a quick return motion of the valve.

7. Apparatus or plant according to claim 3, in which the rotary furnace or kiln has an outlet end provided with peripherally disposed delivery ports, and comprising means for maintaing the upper ports closed as the furnace rotates.

8. Apparatus or plant according to claim 3, in which the rotary furnace or kiln has an outlet end provided with peripherally disposed delivery ports, further comprising a flexible band disposed about the upper and side regions of the ported surface of the furnace or kiln, and means for maintaining said band in position so that only selected delivery ports are open as the furnace rotates.

References Cited in the file of this patent

UNITED STATES PATENTS

| | | |
|---|---|---|
| 1,605,279 | Pike | Nov. 2, 1926 |
| 1,828,270 | Anderson | Oct. 20, 1931 |
| 1,988,798 | Vogel-Jorgensen | Jan. 22, 1935 |
| 2,021,072 | Machlet | Nov. 12, 1935 |
| 2,023,426 | Lasley | Dec. 10, 1935 |
| 2,112,380 | Price | Mar. 29, 1938 |
| 2,478,757 | Foster | Aug. 9, 1949 |
| 2,590,090 | De Vaney | Mar. 25, 1952 |
| 2,693,018 | Czarnecki | Nov. 2, 1954 |

FOREIGN PATENTS

| | | |
|---|---|---|
| 559,822 | Germany | Sept. 24, 1932 |
| 611,686 | Germany | Apr. 3, 1935 |
| 614,699 | Germany | June 15, 1935 |